June 28, 1960  C. BRAMMING  2,942,910
HANDLE FOR VACUUM BOTTLES
Filed Jan. 30, 1957

INVENTOR.
Carl Bramming
BY *Dorus McDougall, Williams & Hersh*
Attorneys

United States Patent Office 2,942,910
Patented June 28, 1960

2,942,910

HANDLE FOR VACUUM BOTTLES

Carl Bramming, Nashville, Tenn., assignor to Aladdin Industries, Incorporated, Nashville, Tenn., a corporation of Illinois Filed Jan. 30, 1957, Ser. No. 637,108

1 Claim. (Cl. 294—31.2)

This invention relates to vacuum bottles or the like, and pertains particularly to handles for vacuum bottles.

One object of the present invention is to provide a new and improved handle unit having adjustable mounting means adapted to attach the handle unit securely to vacuum bootles of a wide range of sizes.

A further object is to provide a new and improved handle unit which is self-contained and adaptable to virtually all vacuum bottles, so that the unit may be sold as an attachment or accessory for vacuum bottles.

Another object is to provide a new and improved handle unit which is convenient to use and highly serviceable, yet is easy to manufacture and low in cost.

Further objects and advantages of the present invention will appear from the following description, taken with the accompanying drawings, in which.

Figure 1:
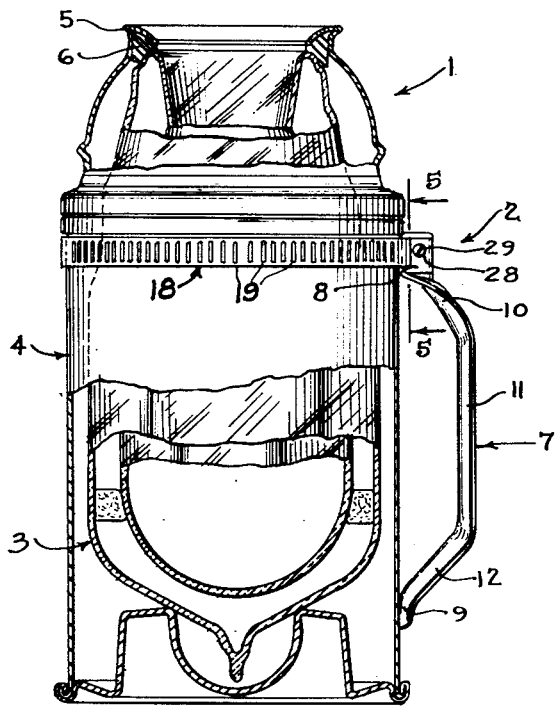
Fig. 1 is a side elevational view showing a vacuum bottle equipped with a handle unit to be described as an illustrative embodiment of the present invention, the vacuum bottle being shown partly in central longitudinal section.
Figure 2:
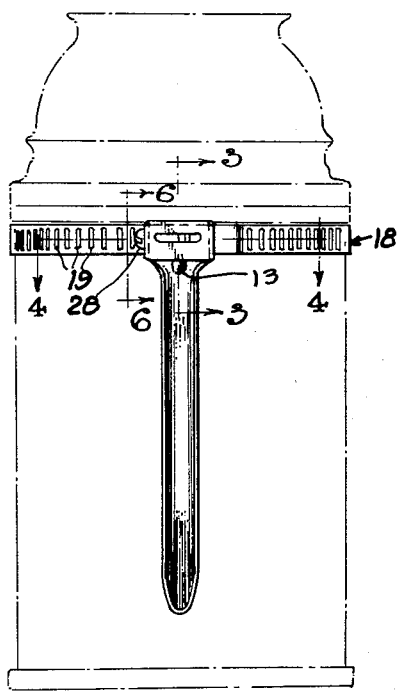
Fig. 2 is a front elevational view of the handle unit, the vacuum bottle being shown in dot-dash outline.
Figure 3:
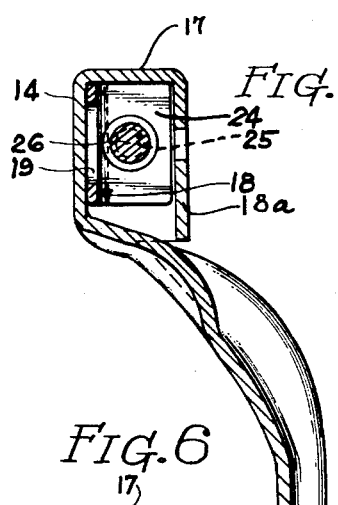
Fig. 3 is a fragmentary enlarged vertical sectional view, taken generally along a line 3—3 in Fig. 2.
Figure 4:
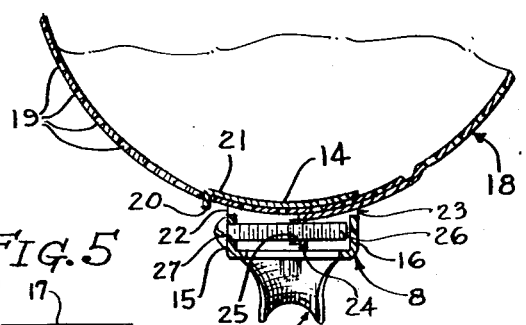
Fig. 4 is a fragmentary enlarged horizontal sectional view, taken generally along a line 4—4 in Fig. 2.
Figure 6:
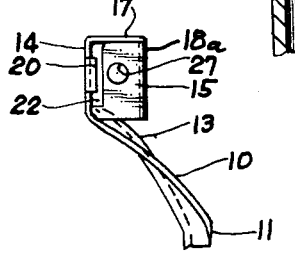
Fig. 6 is a fragmentary enlarged side elevational view of the mounting portion of the handle unit at the upper end of the handle, with the mounting band and the tensioning screw removed.
Figure 5:
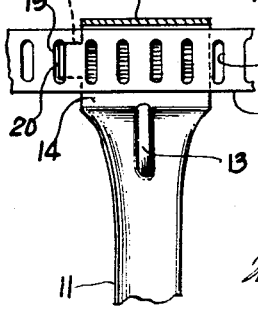
Fig. 5 is a vertical sectional view taken generally along a line 5—5 in Fig. 1.

As already indicated, Fig. 1 illustrates a vacuum bottle 1 equipped with a handle unit 2 to be described as an illustrative embodiment of the present invention. The handle unit 2 is applicable to a wide variety of vacuum bottles or the like. Thus, the specific vacuum bottle 1 is being disclosed merely by way of example. It will be seen that the vacuum bottle is of the well-known type having a vacuum insulated receptacle or bottle 3 housed within a generally cylindrical protective jacket 4, made of sheet metal, plastics or the like. In this case, a metal pouring lip 5 is formed at the upper end of the jacket 4. It will be seen that an annular gasket or sealing ring 6 is disposed between the upper end of the vacuum insulated receptacle 3 and the jacket 4.

The handle unit 2 includes a convenient handle 7 having upper and lower end portions 8 and 9 which are engageable with the cylindrical wall of the jacket 4. The handle 7 has a portion 10 which angles outwardly and downwardly from the upper portion and merges into a substantially vertical grip portion 11 which is offset outwardly from the jacket 4. Below the intermediate grip portion 11, the handle 7 has a portion 12 which angles inwardly and downwardly to the lower portion 9.

It will be seen that the portions 10, 11 and 12 of the handle 7 are generally channel-shaped for enhanced rigidity. A rib 13 is formed along the portion 10 to reinforce the handle at this point.

The upper end portion 8 of the handle 7 takes the form of a housing to serve as one of the mounting elements for the handle. In this case, the housing 8 has an inner wall 14 adapted to engage the cylindrical wall of the jacket 4. First and second lateral walls 15 and 16 extend vertically and project outwardly with respect to the inner wall 14. The housing 8 also has a top wall 17 and an outer wall 18a.

The handle 7 is secured to the jacket 4 by means of a clamping band 18 adapted to extend around the cylindrical jacket. It will be seen that the band 18 is in the form of a thin flat strip of sheet metal or the like. Vertical slots or other apertures 19 are spaced along the band. Actually, it would be feasible to provide the apertures 19 along only one end portion of the band, but, for the sake of appearance, the apertures are provided around substantially the entire band, in the present case.

In order that the effective length of the clamping band 18 may be adjusted, the housing portion 8 of the handle 7 is formed with a prong or hook 20 which is disengageably receivable in any selected aperture 19. In this case, the prong 20 projects outwardly from an extension 21 of the inner wall 14. The extension 21 projects laterally beyond the lateral wall 15 so that the prong 20 is readily visible. Thus, it is easy to engage the prong 20 with the selected aperture 19 in the band.

In this case, the lateral wall 15 is formed with a slot 22 through which the free end portion of the band may extend into the housing 8. Actually, the end portion of the band may be cut or broken off close to the selected aperture 19 through which the prong 20 extends. It will be understood that the band may readily be broken off without the aid of tools, simply by bending the band repeatedly at any one of the apertures 19.

Means are connected between the opposite end of the band 18 and the housing 8 for tensioning or tightening the band. In the handle unit 2 being described by way of example, the opposite end of the band enters the housing 8 through a slot 23 formed in the lateral wall 16 adjacent the inner wall 14. Within the housing 8, the band 18 has an end portion 24 which takes the form of a flange turned outwardly in a generally radial direction. The flange 24 is made to serve as a nut by forming an internally threaded aperture 25 in the flange.

The band 18 is adapted to be tensioned by a screw 26 which extends through a hole 27 formed in the lateral wall 15, opposite the threaded aperture 25. The screw 26 is threaded into the aperture 27 and is provided with a head 28 engageable with the wall 15. A screw driver slot 29, or some other tool receiving formation, is provided on the screw head 28.

The handle unit 2 may be marketed as a handle attachment or accessory for existing vacuum bottles. The band 18 may be made long enough to encircle the largest type of vacuum bottle in common use. For use on smaller vacuum bottles, the free end of the band may be cut or broken off to the desired length.

The handle unit 2 is mounted on the vacuum bottle by wrapping the band 18 around the jacket 4, generally adjacent the upper end of the jacket. The prong 20 on the housing 8 is inserted through any selected aperture 19, according to the necessary length of the band. Then, the band is tightened by rotating the screw 26 with a screw driver or the like so as to draw the flange 24 on the opposite end of the band toward the lateral wall 15. In this way, the handle unit 2 may be attached very securely to the vacuum bottle 1.

The handle unit 2 provides a convenient grip 11 whereby the vacuum bottle may be held securely in the hand of the user. The handle is particularly convenient for use in pouring out the contents of the vacuum bottle. When the handle is provided, there is very little chance that the vacuum bottle will slip out of the hand of the user.

The handle 7 may be slipped over a belt or the upper edge of a pocket, in the manner of a clip, so that the vacuum bottle may be carried without the use of the user's hands. Moreover, the handle prevents the vacuum bottle from rolling to any substantial extent when the vacuum bottle is laid down on its side on a supporting surface.

It will be recognized that the handle unit is highly convenient and serviceable. Nevertheless, it is low in cost and easy to manufacture.

Various modifications, alternative constructions and equivalents may be employed without departing from the true spirit and scope of the invention as exemplified in the foregoing description and defined in the following claim.

I claim:

A handle unit for vacuum bottles or the like, said handle unit comprising a sheet metal housing for engaging the vacuum bottle, a sheet metal handle formed integrally with said housing and extending downwardly and outwardly therefrom, said handle having a lower end portion extending inwardly for engaging the vacuum bottle at a point spaced below said housing, said housing having an integral inner wall for engaging the vacuum bottle and first and second integral lateral walls extending outwardly from said inner wall, each of said lateral walls having a slot therein adjacent said inner wall, a flat band having first and second end portions entering said housing through said first and second slots, said band having a plurality of apertures therein, integral prong extending outwardly on said inner housing wall adjacent said first slot and into one of said apertures in said first end portion of said band, said second end portion thereof having an outwardly turned flange thereon disposed in said housing and formed with a threaded aperture, said first lateral wall having a hole therein opposite said threaded aperture, and a tensioning screw extending through said hole and threaded into said threaded aperture for tensioning said band.

References Cited in the file of this patent

UNITED STATES PATENTS

| | | |
|---|---|---|
| 846,400 | Cox | Mar. 5, 1907 |
| 1,250,467 | Johnson | Dec. 18, 1917 |
| 1,816,197 | Ruemelin | July 28, 1931 |
| 2,262,339 | Shaffer | Nov. 11, 1941 |
| 2,307,145 | Mattoon | Jan. 5, 1943 |
| 2,489,535 | Montague | Nov. 29, 1949 |
| 2,495,688 | Blakeslee | Jan. 31, 1950 |
| 2,540,860 | Blomquist | Feb. 6, 1951 |
| 2,605,010 | Sieling | July 29, 1952 |

FOREIGN PATENTS

| | | |
|---|---|---|
| 451,701 | Great Britain | Aug. 11, 1936 |